(12) United States Patent
Zhang et al.

(10) Patent No.: US 11,312,266 B2
(45) Date of Patent: Apr. 26, 2022

(54) ELECTRIC SEAT AND ANGLE ADJUSTMENT DEVICE THEREOF

(71) Applicant: HUBEI HAPM MAGNA SEATING SYSTEMS CO., LTD, Hubei (CN)

(72) Inventors: Yong Zhang, Xiangyang (CN); Bin Li, Xiangyang (CN); Chong Jiang, Xiangyang (CN); Zhengkun Huang, Xiangyang (CN)

(73) Assignee: HUBEI AVIATION PRECISION MACHINERY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/767,547

(22) PCT Filed: Aug. 3, 2018

(86) PCT No.: PCT/CN2018/098498
§ 371 (c)(1),
(2) Date: May 27, 2020

(87) PCT Pub. No.: WO2019/114286
PCT Pub. Date: Jun. 20, 2019

(65) Prior Publication Data
US 2021/0170917 A1 Jun. 10, 2021

(30) Foreign Application Priority Data

Dec. 12, 2017 (CN) .......................... 201711321068.X
Dec. 12, 2017 (CN) .......................... 201721748382.1

(51) Int. Cl.
*B60N 2/22* (2006.01)
*B60N 2/02* (2006.01)
(Continued)

(52) U.S. Cl.
CPC ............ *B60N 2/0232* (2013.01); *B60N 2/224* (2013.01); *B60N 2/168* (2013.01); *B60N 2/2252* (2013.01);
(Continued)

(58) Field of Classification Search
CPC .... B60N 2/169; B60N 2/1896; B60N 2/1882; B60N 2/167; B60N 2/943; B60N 2/933;
(Continued)

(56) References Cited

U.S. PATENT DOCUMENTS 5,681,086 A * 10/1997 Baloche ................. B60N 2/236
297/354.12
6,520,583 B1 * 2/2003 Bonk ..................... B60N 2/236
192/223.1
(Continued)

FOREIGN PATENT DOCUMENTS

| CN | 101612903 A | 12/2009 |
|---|---|---|
| CN | 101941389 A | 1/2011 |

(Continued)

OTHER PUBLICATIONS 3803 3SOO, Japanese 1st office Action, Date of Drafting Jul. 28, 2021, dated Aug. 3, 2021.
(Continued)

*Primary Examiner* — Syed A Islam
(74) *Attorney, Agent, or Firm* — Dickinson Wright PLLC

(57) ABSTRACT

An electric seat and an angle adjustment device thereof are provided. The angle adjustment device includes an inner toothed plate and an outer toothed plate engaging with each other, and an eccentric cavity formed therebetween. An eccentric ring completely occupying a positive eccentric region of the eccentric cavity is provided in the eccentric cavity. The eccentric ring has a first accommodating region and a second accommodating region along a circumferential
(Continued)

direction. The angle adjustment device further comprises a driving component for driving rotation of the eccentric ring. A damping component is provided in the first accommodating region and/or the second accommodating region, and the damping component is in a compressed state during operation of the driving component. The damping component eliminates a useless stroke in the above operation, thereby eliminating an adjustment lag experienced by a passenger during reverse adjustment of a seat and backrest.

14 Claims, 6 Drawing Sheets

(51) Int. Cl.
    *B60N 2/225*            (2006.01)
    *B60N 2/90*             (2018.01)
    *B60N 2/16*             (2006.01)

(52) U.S. Cl.
    CPC .......... *B60N 2/2258* (2013.01); *B60N 2/943* (2018.02); *B60N 2002/0236* (2013.01)

(58) Field of Classification Search
    CPC .... B60N 2/2258; B60N 2/2356; B60N 2/236; B60N 2/224; B60N 2/2252; B60N 2/2254; B60N 2/168
    See application file for complete search history.

(56) References Cited

U.S. PATENT DOCUMENTS

| | | | | |
|---|---|---|---|---|
| 6,675,945 B2* | 1/2004 | Kim | ..... | B60N 2/1803 192/223 |
| 6,918,635 B2* | 7/2005 | Finner | ..... | B60N 2/2252 297/362 |
| 7,607,737 B2* | 10/2009 | Liebich | ..... | B60N 2/2254 297/362 |
| 8,262,165 B2* | 9/2012 | Mitsuhashi | ..... | B60N 2/236 297/362 |
| 8,348,344 B2* | 1/2013 | Richard | ..... | B60N 2/167 297/344.12 |
| 8,590,972 B2* | 11/2013 | Jiang | ..... | B60N 2/2252 297/362 |
| 8,672,408 B2* | 3/2014 | Legras | ..... | B60N 2/2255 297/362 |
| 8,820,501 B2* | 9/2014 | Hur | ..... | B60N 2/167 192/15 |
| 9,376,035 B2* | 6/2016 | Jiang | ..... | B60N 2/2252 |
| 9,475,409 B2* | 10/2016 | Jiang | ..... | B60N 2/2213 |
| 9,527,410 B2* | 12/2016 | Leconte | ..... | B60N 2/2227 |
| 9,616,780 B2* | 4/2017 | Gallienne | ..... | B60N 2/933 |
| 9,878,641 B2* | 1/2018 | Gallienne | ..... | B60N 2/236 |
| 9,884,572 B2* | 2/2018 | Kaku | ..... | F16D 65/22 |
| 9,964,191 B2* | 5/2018 | Hochmuth | ..... | B60N 2/02 |
| 9,987,952 B2* | 6/2018 | Chae | ..... | B60N 2/167 |
| 9,994,132 B2* | 6/2018 | Stemmer | ..... | B60N 2/167 |
| 10,029,588 B2* | 7/2018 | Maeda | ..... | B60N 2/2245 |
| 10,065,538 B2* | 9/2018 | Desquesne | ..... | B60N 2/20 |
| 10,358,055 B2* | 7/2019 | Huang | ..... | A47C 7/44 |
| 10,428,882 B2* | 10/2019 | Kaku | ..... | F16D 51/12 |
| 2003/0057032 A1* | 3/2003 | Liu | ..... | F16D 51/42 188/24.12 |
| 2012/0025586 A1 | 2/2012 | Legras et al. | | |
| 2014/0239694 A1 | 8/2014 | Jiang et al. | | |
| 2018/0072194 A1* | 3/2018 | Huang | ..... | A47C 7/44 |

FOREIGN PATENT DOCUMENTS

| | | |
|---|---|---|
| CN | 103129418 A | 6/2013 |
| CN | 103661021 A | 3/2014 |
| CN | 106388368 A | 2/2017 |
| CN | 107933383 A | 4/2018 |
| CN | 207535735 U | 6/2018 |
| DE | 102009060344 A1 | 6/2011 |
| FR | 3006637 A1 | 12/2014 |

OTHER PUBLICATIONS

European Search Report—Application No. EP 18 88 7742, Dated Aug. 12, 2021, Applicant/Proprietor Hubei Aviation Precision Machinery Technology Co., Ltd.

* cited by examiner

ELECTRIC SEAT AND ANGLE ADJUSTMENT DEVICE THEREOF

The present application is a national phase of International Application No. PCT/CN2018/098498, titled "ELECTRIC SEAT AND ANGLE ADJUSTMENT DEVICE THEREOF", filed on Aug. 3, 2018, which claims the benefits of Chinese patent application No. 201711321068.X, entitled "ELECTRIC SEAT AND ANGLE ADJUSTMENT DEVICE THEREOF" and Chinese patent application No. 201721748382.1, entitled "ELECTRIC SEAT AND ANGLE ADJUSTMENT DEVICE THEREOF", filed with the China National Intellectual Property Administration on Dec. 12, 2017, all of which applications are incorporated herein in their entireties by this reference.

FIELD

The present application relates to the technical field of automobile parts, and in particular to an electric seat and an angle adjustment device for the electric seat.

BACKGROUND

A seat angle adjuster is used for connecting a chair seat and a chair back of an automobile seat. Passengers can obtain the most comfortable and accustomed riding angle by adjusting an angle of the chair back to the optimal position through the seat angle adjuster. Drives can obtain the best view by adjusting the angle of the chair back, and can easily manipulate a steering wheel, a pedal, a shift lever and other operating parts by adjusting the angle of the chair back. With the development of the automobile industry, customers' requirements for the angle adjuster and the comfort performance of the seat are gradually improved.

At present, the electric seat angle adjuster generally adopts a planetary gear transmission principle, and when the members are assembled, due to the existence of a certain degree of processing and assembling errors, there is a certain distance between a driving member and a driving matching surface, and the distance between the driving member and the driving matching surface forms an operating idle stroke of the electric seat angle adjuster.

Due to the existence of the above operating idle stroke, when the chair seat and the chair back are in reversing operation, the driving member must first pass through the operating idle stroke and then be in contact with the driving matching surface, thereby causing the problems of driving out-of-synchronization, backrest adjustment lag, reversing impact noise and the like in the reversing operation process, and causing the poor comfort of the electric seat.

In view of this, a technical problem to be solved urgently by those skilled in the art is how to provide an angle adjuster for an electric seat, which can eliminate or reduce the operating idle stroke of the driving member, thereby improving the comfort of the electric seat.

SUMMARY

In order to solve the above technical problem, an object of the present application is to provide an angle adjustment device for an electric seat, which includes an inner toothed plate and an outer toothed plate engaging with each other, an eccentric cavity is formed between the inner toothed plate and the outer toothed plate, an eccentric ring filling a forward eccentric zone of the eccentric cavity is arranged in the eccentric cavity, the eccentric ring is provided with a first accommodating zone and a second accommodating zone in the circumferential direction, and the angle adjustment device for an electric seat further includes a driving member for driving the eccentric ring to rotate. A damping member is arranged in the first accommodating zone and/or the second accommodating zone, and the damping member is in a compressed state during the working of the driving member.

In the present application, after the damping member is arranged, the damping member can fill the operating idle stroke of the angle adjustment device, so that the damping member is in a compressed state before the driving member is matched with the driving matching surface, and after the driving member is matched with the driving matching surface, the eccentric ring is driven to rotate, achieving the angle adjustment. Therefore, the arrangement of the damping member can eliminate the operating idle stroke described above, thereby eliminating the adjustment lag felt by the passenger during the reversing adjustment process of the seat and the backrest, and the arrangement of the damping member can consume energy when the driving member is in contact with the driving matching surface, thereby reducing the noise during reversing adjustment of the seat and the backrest, and further improving the comfort of the electric seat.

In one embodiment, a wedge-shaped block is arranged in the first accommodating zone, and the driving member can drive the wedge-shaped block or the eccentric ring to drive the eccentric ring to rotate; and the angle adjustment device further includes an elastic member for compressing the eccentric ring and the wedge-shaped block.

In one embodiment, the driving member includes a first driving block extending into the first accommodating zone and a second driving block extending into the second accommodating zone, and each of the first driving block and the second driving block has a driving working surface and a non-driving working surface; and the damping member includes a first damping element arranged in the first accommodating zone and a second damping element arranged in the second accommodating zone, one end of each of the first damping element and the second damping abuts against the non-driving working surface of the relative driving block, and another end of the two damping elements abuts against the side wall of the relative accommodating zone.

In one embodiment, the first accommodating zone is filled with the first driving block and the first damping element, and the second accommodating zone is filled with the second driving block and the second damping element.

In one embodiment, the first damping element and the second damping element are of separate structures.

In one embodiment, the first damping element is a rubber block or a spring, and the second damping element is a rubber block or a spring.

In one embodiment, the damping member is an integrally formed elastic structure and is provided with a groove, the groove is engaged with the eccentric ring, and the first damping element and the second damping element are provide on two sides of the groove, respectively.

In one embodiment, an accommodating groove for engaging with the relative damping element is provided in a side wall of each of the first accommodating zone and the second accommodating zone.

In one embodiment, each of the first damping element and the second damping element is of a blocky structure, and an oil guiding groove is arranged in an outer periphery of each of the first damping element and the second damping element.

In addition, the present application further provides an electric seat which includes a chair seat and a chair back, and the chair seat is connected with the chair back through an angle adjustment device, where the angle adjustment device is the angle adjustment device described above.

Figure 1:
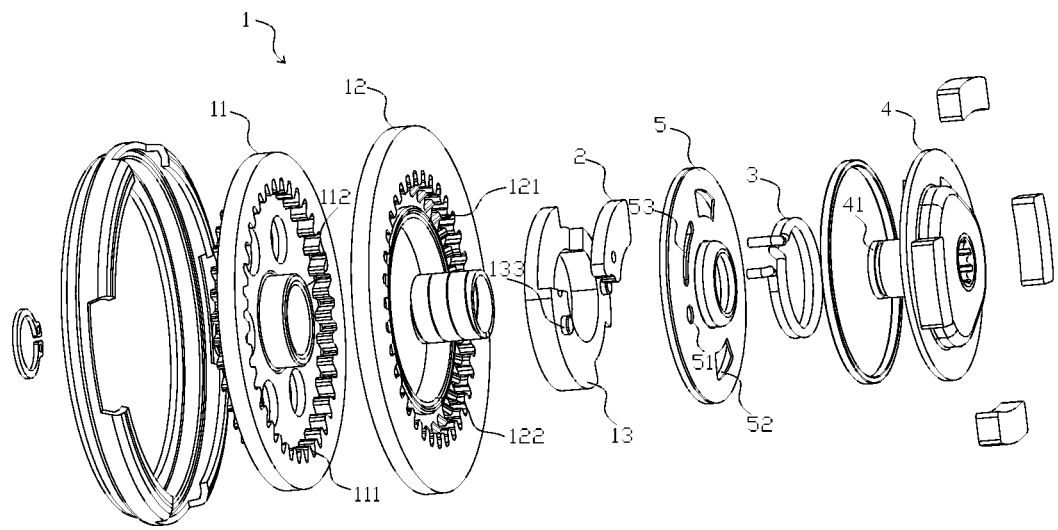
FIG. 1 is an exploded view of an angle adjustment device according to the present application when a damping member is removed.

Reference numerals in FIGS. 1 to 10:

| 1 | gear mechanism, | 11 | inner toothed plate, |
|---|---|---|---|
| 111 | inner toothed ring, | 112 | shaft collar, |
| 12 | outer toothed plate, | 121 | outer toothed ring, |
| 122 | center hole, | 13 | eccentric ring, |
| 131 | first accommodating zone, | 132 | second accommodating zone, |
| 133 | flange, | 134 | first buffering matching face, |
| 135 | second driving matching face, | 136 | second buffering matching face, |
| 14 | accommodating groove, | 15 | damping member, |
| 151 | oil guiding groove; | 21 | first driving matching face, |
| 2 | wedge-shaped block, | 41 | rotating shaft, |
| 3 | torsion spring; | 43 | second driving block, |
| 4 | driving wheel, | 45 | non-drive working surface; |
| 42 | first driving block, | 51 | fixing hole, |
| 44 | driving work surface, | 53 | locking hole. |
| 5 | locking plate, | | |
| 52 | driving hole, | | |

DETAIL DESCRIPTION OF THE EMBODIMENTS

In order to enable those skilled in the art to better understand the solutions of the present application, the present application is further described in detail hereinafter in conjunction with the accompanying drawings and specific embodiments.

Figure 2:
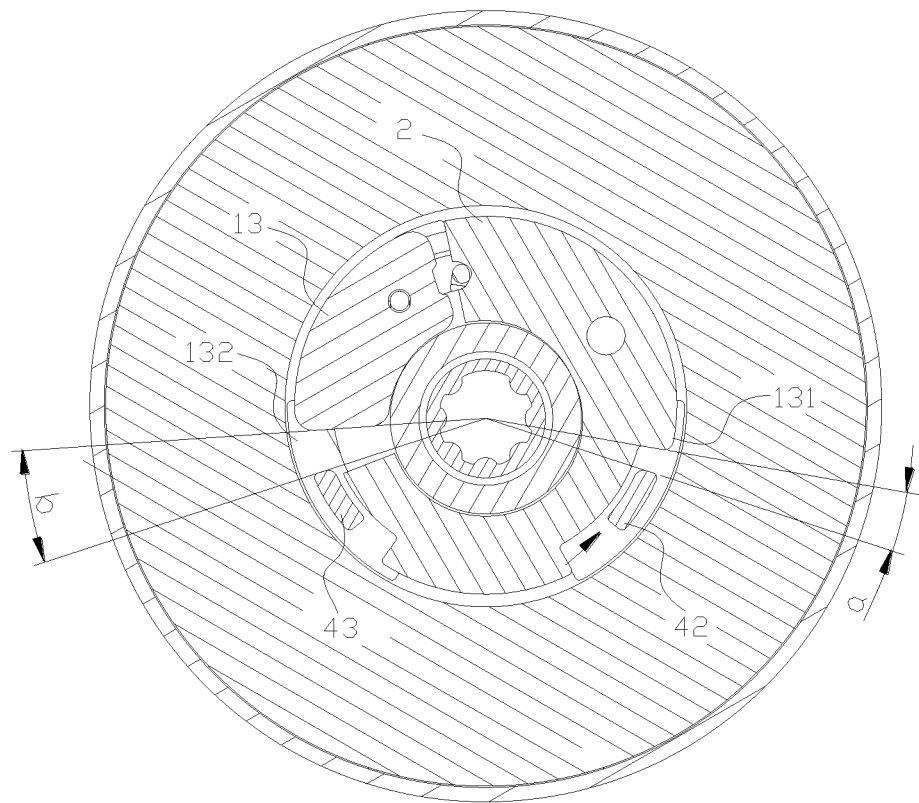
FIG. 2 is a schematic diagram of a gear mechanism shown in FIG. 1.
Figure 3:
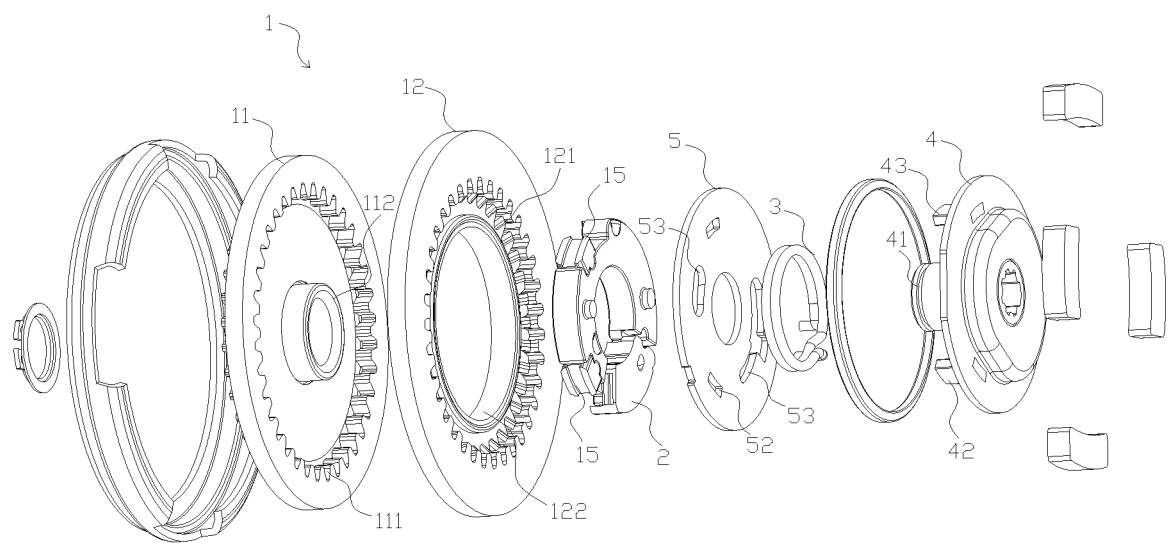
FIG. 3 is an exploded view of the angle adjustment device according to the present application.
Figure 4:
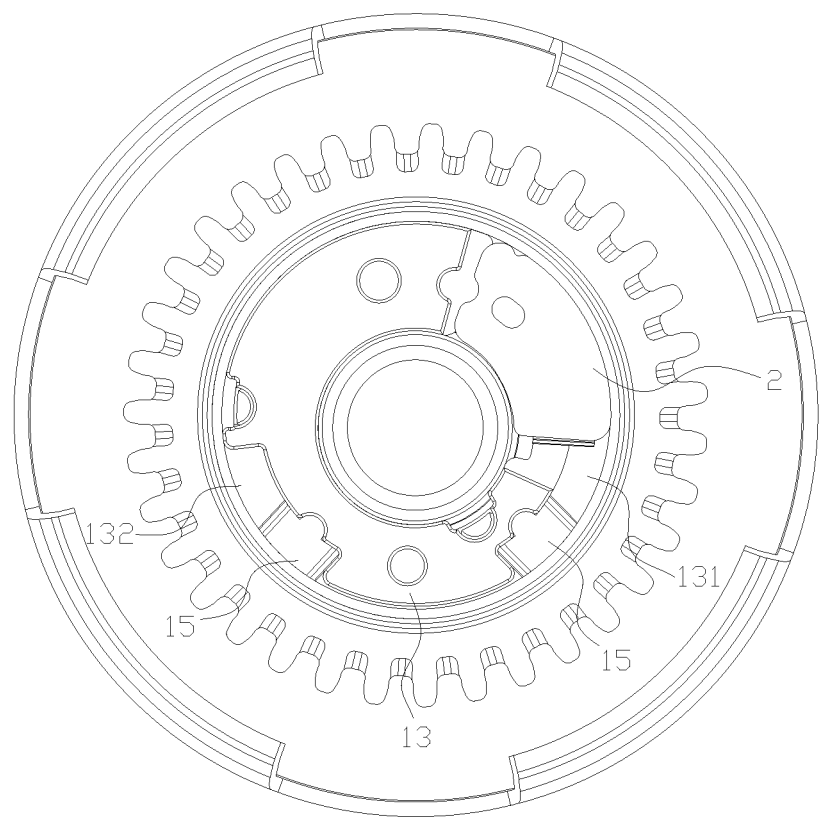
FIG. 4 is a top view of the angle adjustment device according to the present application.
Figure 5:
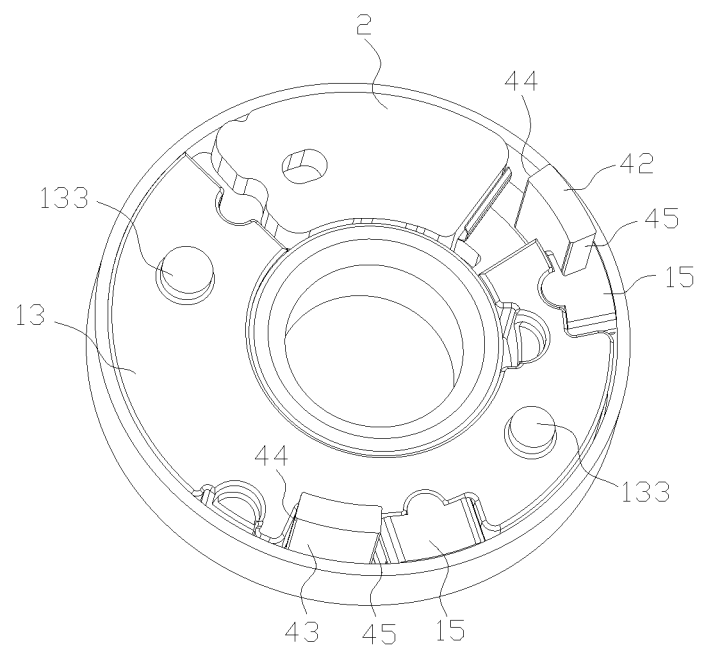
FIG. 5 illustrates the matching relationship between a wedge-shaped block, the damping member, a driving block and an eccentric ring shown in FIG. 4.
Figure 6:
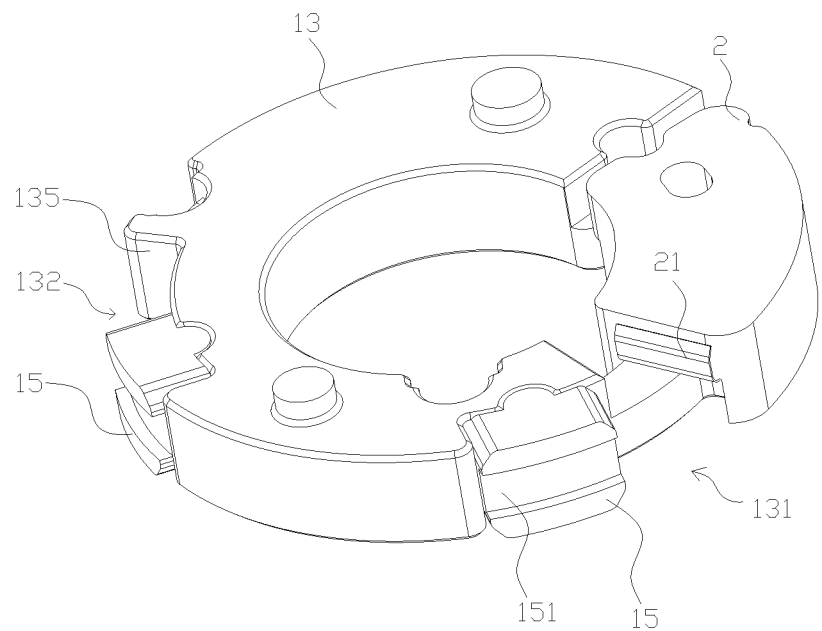
FIG. 6 is a schematic structural view when the eccentric ring shown in FIG. 5 is provided with a first damping member.
Figure 7:
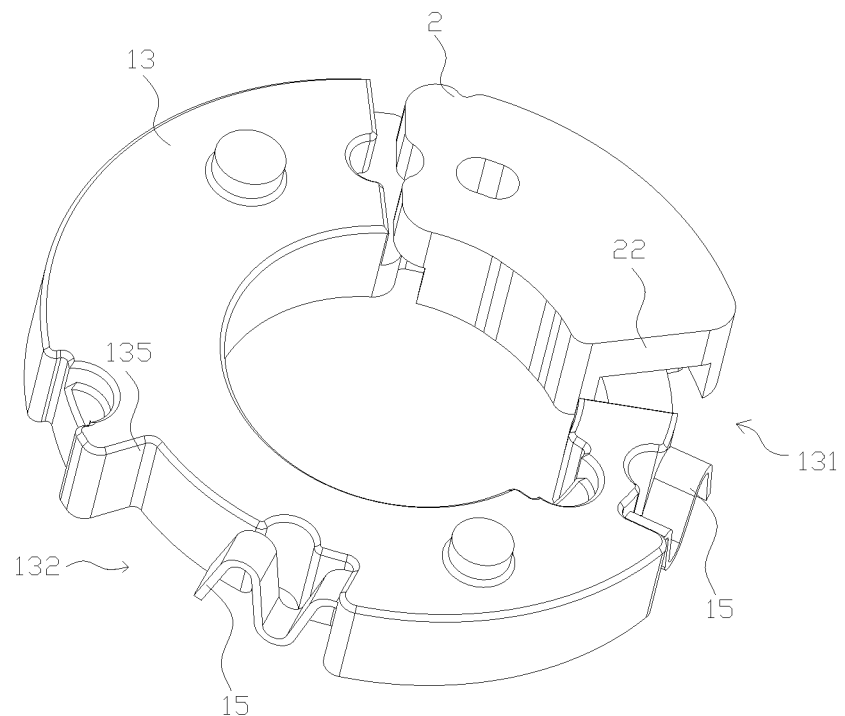
FIG. 7 is a schematic structural view when the eccentric ring shown in FIG. 5 is provided with a second damping member.
Figure 8:
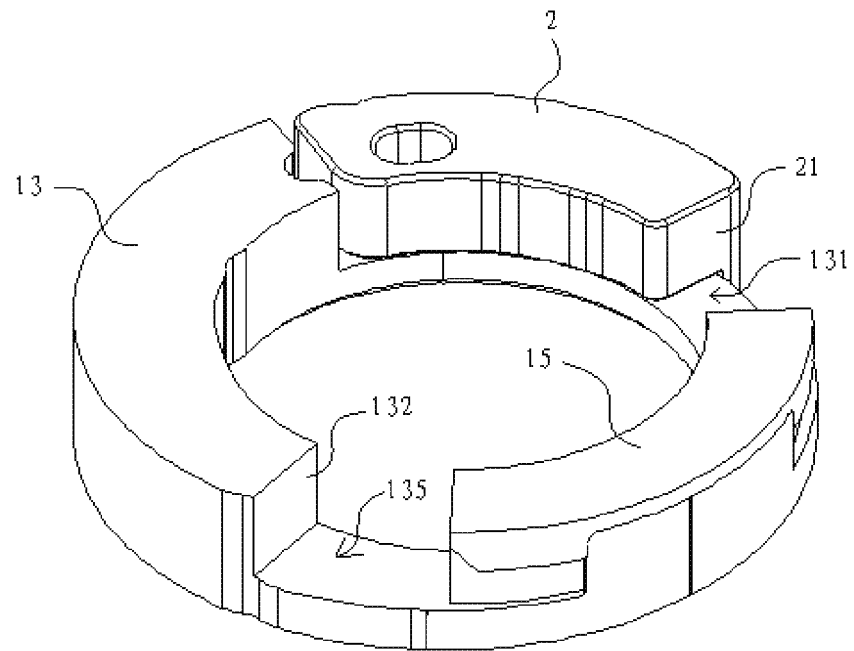
FIG. 8 is a schematic structural view when the eccentric ring shown in FIG. 5 is provided with a third damping member.
Figure 9:
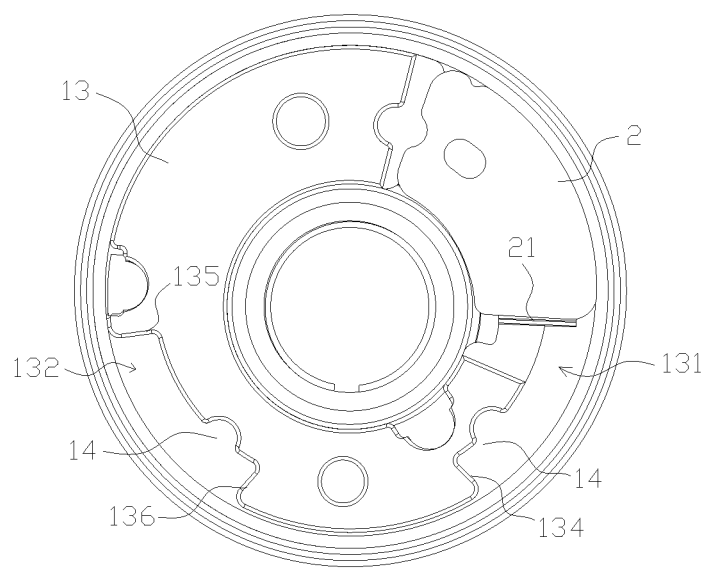
FIG. 9 is a schematic structural view when the damping member is removed in FIG. 5.
Figure 10:
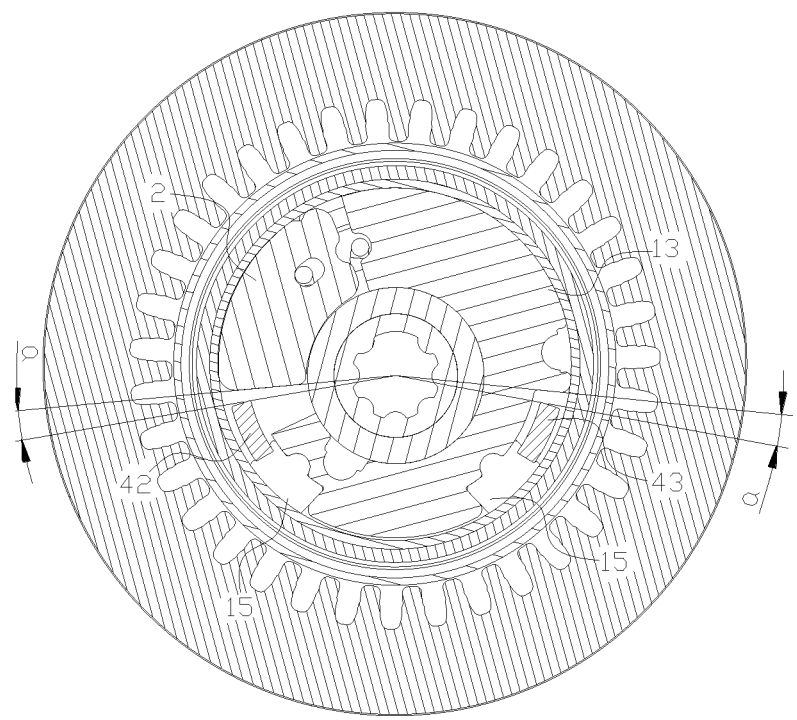
FIG. 10 is a transverse sectional view of FIG. 9.

Referring to FIGS. 1 to 10, FIG. 1 is an exploded view of an angle adjustment device according to the present application when a damping member is removed; FIG. 2 is a schematic diagram of a gear mechanism shown in FIG. 1; FIG. 3 is an exploded view of the angle adjustment device according to the present application; FIG. 4 is a top view of the angle adjustment device according to the present application; FIG. 5 illustrates the matching relationship between a wedge-shaped block, the damping member, a driving block and an eccentric ring shown in FIG. 4; FIG. 6 is a schematic structural view when the eccentric ring shown in FIG. 5 is provided with a first damping member; FIG. 7 is a schematic structural view when the eccentric ring shown in FIG. 5 is provided with a second damping member; FIG. 8 is a schematic structural view when the eccentric ring shown in FIG. 5 is provided with a third damping member; FIG. 9 is a schematic structural view when the damping member is removed in FIG. 5; and FIG. 10 is a transverse sectional view of FIG. 9.

In a specific embodiment, the present application provides an angle adjustment device for an electric seat, as shown in FIG. 1, which includes an inner toothed plate 11 having an inner toothed ring 111 and an outer toothed plate 12 having an outer toothed ring 121, the inner toothed plate 11 is used for being connected with a seat of an electric seat, and the outer toothed plate 12 is used for being connected with a seat back of the electric seat. A shaft collar 112 is provided in the middle of the inner toothed plate 11. A central hole 122 is formed in the middle of the outer toothed plate 12, the inner toothed plate 11 is eccentrically engaged with the outer toothed plate 12 through the inner toothed ring 111 and the outer toothed ring 121, and an eccentric cavity is formed between the shaft collar 12 and the central hole 122 after engaging. An eccentric ring 13 filling a forward eccentric zone of the eccentric cavity is arranged in the eccentric cavity, and the forward eccentric zone refers to a zone with a large inner radial size of the eccentric cavity.

In the present application, a gear mechanism 1 is formed by the inner toothed plate 11, the outer toothed plate 12 and the eccentric ring 13, and the gear mechanism 1 is a less-tooth-difference planetary gear transmission mechanism, and on the basis of realizing transmission, the gear mechanism 1 has the advantage of being compact in structure, and can be used for the electric seat.

Specifically, as shown in FIGS. 1 and 2, the eccentric ring 13 is provided with a first accommodating zone 131 and a second accommodating zone 132 in the circumferential direction, a driving member for driving the eccentric ring 13 to rotate is arranged in the first accommodating zone 131 and/or the second accommodating zone 132, and under the driving of the driving member, the eccentric ring 13 rotates, so that the inner toothed plate 11 rotates with respect to the outer toothed plate 12, thereby realizing the adjustment of the angle between the chair seat and the chair back.

In the present embodiment, the driving member achieves the rotation of the eccentric ring 13 by driving the side walls of the first accommodating zone 131 and/or the second accommodating zone 132, however, as shown in FIG. 2, a certain operating idle strokes a and b are formed between the driving member and driving matching surface of the first accommodating zone 131 and/or between the driving member and driving matching surface of the second accommodating zone 132, that is, a certain distance is formed between the driving member and the driving matching surface. When the angle adjustment device works, the driving member needs to pass through the operating idle strokes a and b before abutting against the driving matching surface, and then the driving member can be matched with the driving matching surface.

Therefore, in the above angle adjustment device, due to the existence of the operating idle strokes a and b, when the seat and the backrest are reversely adjusted, the passenger can feel an apparent lag in the adjusting process, which affects the comfort during reversing of the electric seat. When the driving member is matched with the driving matching surface after passing through the operating idle strokes a and b, the driving member is in contact with the driving matching surface at a high speed, so that a significant noise is generated when the seat and the chair back are reversely adjusted, which also affects the comfort of the electric seat.

In order to solve the above technical problem, in the angle adjustment device according to the present application, a damping member 15 is further arranged in the first accommodating zone 131 and/or the second accommodating zone 132 in addition to the driving member.

In the present application, after the damping member 15 is arranged, the damping member 15 can fill the operating idle stroke of the angle adjustment device, so that the damping member 15 is in a compressed state before the driving member is matched with the driving matching surface, and after the driving member is matched with the driving matching surface, the damping member 15 drives the eccentric ring 13 to rotate, thereby achieving the angle adjustment. Therefore, the arrangement of the damping member 15 can eliminate the operating idle stroke, thereby eliminating the adjustment lag felt by passengers during the reversing adjustment process of the seat and the backrest, and the arrangement of the damping member 15 can also consume energy when the driving member is in contact with the driving matching surface, thereby reducing the noise when the seat and the backrest are reversely adjusted, and further improving the comfort of the electric seat.

Further, a wedge-shaped block 2 is arranged in the first accommodating zone 131 of the eccentric ring 13. In the first accommodating zone 131, the driving member drives the eccentric ring 13 to rotate by driving the wedge-shaped block 2. The angle adjustment device further includes an elastic member, and the elastic force of the elastic member compresses the eccentric ring 13 and the wedge-shaped block 2.

When the angle adjustment device works, the circumferential elastic force applied by the elastic member acts on the eccentric ring 13 and the wedge-shaped block 2, so that the eccentric ring 13 abuts against a hole wall of a central hole 122 of the outer toothed plate 12, and the wedge-shaped block 2 abuts against the shaft collar 112 of the inner toothed plate 11, thereby eliminating the clearance between engaging teeth of the inner toothed ring 111 and the outer toothed ring 121, and further improving the comfort of the electric seat.

Specifically, the elastic member can be a torsion spring 3 having two axial legs arranged in the same direction. During assembly, one leg of the torsion spring 3 is mounted into a fixing hole of the wedge-shaped block 2 after passing through a locking hole 53 of a locking plate 5, and the other leg abuts against the inner wall of the wedge-shaped block 2 after passing through the locking hole 53, so that the eccentric ring 13 and the wedge-shaped block 2 are tightly wedged by the torsion spring 3.

Further, as shown in FIG. 5, the driving member includes a first driving block 42 extending into the first accommodating zone 131 and a second driving block 43 extending into the second accommodating zone 132, and the two driving blocks are both convex blocks arranged on the end face of a driving wheel 4. Specifically, the first driving block 42 and the second driving block 43 extend into the first accommodating zone 131 and the second accommodating zone 132 of the eccentric ring 13 respectively after passing through the two driving holes 52 of the locking plate 5, and each of two driving blocks is provided with a driving working surface 44 and a non-driving working surface 45 in the circumferential direction. The locking plate 5 also has a fixing hole 51 connected with the other members.

In order to further eliminate the operating idle strokes a and b between the driving member and the driving matching surface, the damping member 15 is arranged in each of the first accommodating zone 131 and the second accommodating zone 132, and the damping member 15 located in the first accommodating zone 131 is a first damping member, and the damping member 15 located in the second accommodating zone 132 is a second damping member. In the two driving blocks, one of the two driving blocks is in a driving mode and the other is in a non-driving mode, one end of the damping member 15 in each of the two accommodating zones abuts against the non-driving working surface 45 of the corresponding driving block, and the other end of the damping member 15 abuts against the circumferential side wall of the corresponding accommodating zone.

Specifically, as shown in FIGS. 6 to 9, in the first accommodating zone 131, two ends of the damping member 15 (the first damping element) abut against the first driving block 42 and a first buffering matching face 134 of the first accommodating zone 131 in the circumferential direction, respectively. In the second accommodating zone 132, two ends of the damping member 15 (the first damping element) abut against the second driving block 43 and a second buffering matching face 134 of the second accommodating zone 132 in the circumferential direction, respectively.

When the first driving block 42 is a driving end, as shown in FIG. 5, in the process that a rotating shaft 41 drives the driving wheel 4 to rotate, the second driving block 43 moves toward the damping member 15 (the second damping element) and compresses the damping member 15 before the first driving block 42 is in contact with the first driving matching surface 21, and when the damping member 15 (the second damping element) is deformed into that the first driving block 42 can be in contact with the first driving matching surface 21 during compression, the first driving block 42 drives the eccentric ring 13 to rotate by the wedge-shaped block 2. When the second driving block 43 is the driving end, the rotating shaft 41 drives the driving wheel 4 to rotate reversely, the first driving block 42 moves towards the damping member 15 (the first damping element) and compresses the damping member 15 before the second driving block 43 is in contact with the second driving matching surface 135, and when the damping member 15 (the first damping element) is deformed into that the second driving block 43 can be in contact with the second driving matching surface 135 during compression, the second driving block 43 drives the eccentric ring 13 to rotate reversely.

In order to achieve the reversing operation, it is necessary to ensure that the damping member 15 has a sufficient amount of deformation.

Further, the first accommodating zone 131 is filled with the first driving block 42 and the damping member 15 (the first damping element), and the second accommodating zone 132 is filled with the second driving block 43 and the damping member 15 (the second damping element).

In the present embodiment, by controlling the size of the damping member 15, it can achieve that the driving block and the damping member 15 fill the corresponding accommodating zone as much as possible, so that when the driving block of the driving end is in contact with the corresponding driving matching surface, the required amount of deformation of the damping member 15 is less, thereby prolonging the service life of the damping member 15.

In addition, as shown in FIG. 2, when the damping member is not provided, the operating idle strokes a and b are randomly distributed, both of which may be different or the same, and when the operating idle stroke a and b are different, the eccentric directions of the eccentric ring 13 are different in the two directions, thereby resulting in that driving forces are different when the angle adjustment device is adjusted in two directions.

In the present application, as shown in FIG. 10, by controlling the size of the damping members 15 in the two accommodating zones, the distance between each of the two driving blocks and the corresponding driving matching surface is adjustable, so that the distances can be artificially controlled to be equal to allow the eccentric directions on the two sides of the eccentric ring 13 consistent.

Specifically, as shown in FIG. 6, the damping members 15 in each of the first accommodating zone 131 and the second accommodating zone 132 can be a rubber block, that is, the first damping element and the second damping element are both rubber blocks, and the rubber block is always in an elastic deformation stage during the working process of the angle adjustment device to avoid yielding and crushing, thereby ensuring that the angle adjustment device can work normally.

As shown in FIG. 7, the damping member 15 can also be a spring, and in addition, the damping members 15 in the first accommodation zone 131 and the second accommodating zone 132 can be the same or different, that is, the first damping element and the second damping element can be the same structure or different structures, for example: the first damping element is a rubber block, and the second damping element is a spring.

As shown in FIG. 8, the damping member 15 in the first accommodating zone 131 and the damping member 15 in the second accommodating zone 132 can also be an integrally formed elastic structure, that is, the first damping element and the second damping element can also be the integrally formed elastic structure, a groove is arranged in the middle of the damping member 15, and the two ends of the groove are respectively located in the two accommodating zones, that is, the two ends of the groove of the damping member 15 form the first damping element and the second damping element, respectively. The damping member 15 is buckled on the eccentric ring 13.

Further, as shown in FIG. 9, in order to improve the mounting reliability of the damping member 15, an accommodating groove 14 for engaging with the damping member 15 is provided in the side wall of each of the first accommodating zone 131 and the second accommodating zone 132, and the damping member 15 is arranged in the accommodating groove 14.

In the above embodiments, as shown in FIG. 6, when each of the first damping element and the second damping element is of a block structure, an oil guiding groove 151 is provided in the outer periphery of each of the first damping element and the second damping element.

In the present embodiment, by arranging the oil guide groove 151 in the outer periphery of the damping member 15, the lubricating oil can be introduced into the angle adjustment device, thereby reducing the abrasion of the members during relative movement, prolonging the service life of the angle adjustment device, and further reducing the noise during working.

In addition, the present application further provides an electric seat which includes a chair seat and a chair back, the chair seat and the chair back are connected through an angle adjustment device, and the angle between the chair seat and the chair back is changed through the angle adjustment device. The angle adjustment device is the angle adjustment device according to any one of the above embodiments. Since the angle adjustment device has the above technical effect, the electric seat including the angle adjustment device should also have a corresponding technical effect, which will not be repeated here.

The electric seat and the angle adjustment device thereof according to the present application are described in detail. Although the principles and embodiments of the present application have been described herein with specific examples, the description of the embodiments above is merely intended to aid in the understanding of the methods and core concepts of the present application. It should be noted that multiple improvements and modifications of the present application may be made by those skilled in the art without departing from the principles of the present application, which are also within the scope of the present application defined by the claims.

The invention claimed is:

1. An angle adjustment device for an electric seat, comprising an inner toothed plate and an outer toothed plate engaging with each other, an eccentric cavity being formed between the inner toothed plate and the outer toothed plate, an eccentric ring filling a forward eccentric zone of the eccentric cavity being arranged in the eccentric cavity, the eccentric ring being provided with a first accommodating zone and a second accommodating zone in a circumferential direction, and the angle adjustment device for an electric seat further comprising a driving member for driving the eccentric ring to rotate; wherein, a damping member is arranged in the first accommodating zone and/or the second accommodating zone, and the damping member is in a compressed state during working of the driving member, a wedge-shaped block is arranged in the first accommodating zone, and the driving member is configured to drive the wedge-shaped block or the eccentric ring to drive the eccentric ring to rotate; and the angle adjustment device further comprises an elastic member for compressing the eccentric ring and the wedge-shaped block, the driving member comprises a first driving block extending into the first accommodating zone and a second driving block extending into the second accommodating zone, and each of the first driving block and the second driving block has a driving working surface and a non-driving working surface; and the damping member comprises a first damping element arranged in the first accommodating zone and a second damping element arranged in the second accommodating zone, one end of each of the first damping element and the second damping abuts against the non-driving working surface of a relative driving block, and another end of each of the first damping element and the second damping element abuts against a side wall of a relative accommodating zone.

2. The angle adjustment device according to claim 1, wherein, the first accommodating zone is filled with the first driving block and the first damping element, and the second accommodating zone is filled with the second driving block and the second damping element.

3. The angle adjustment device according to claim 1, wherein, the first damping element and the second damping element are of separate structures.

4. The angle adjustment device according to claim 3, wherein, the first damping element is a rubber block or a spring, and the second damping element is a rubber block or a spring.

5. The angle adjustment device according to claim 1, wherein, the damping member is an integrally formed elastic structure and is provided with a groove, the groove is engaged with the eccentric ring, and the first damping element and the second damping element are provided on two sides of the groove, respectively.

6. The angle adjustment device according to claim 1, wherein, an accommodating groove for engaging with a relative damping element is provided in a side wall of each of the first accommodating zone and the second accommodating zone.

7. The angle adjustment device according to claim 1, wherein, each of the first damping element and the second damping element is of a blocky structure, and an oil guiding groove is arranged in an outer periphery of each of the first damping element and the second damping element.

8. An electric seat, comprising a chair seat and a chair back, the chair seat being connected to the chair back through an angle adjustment device, wherein the angle adjustment device is the angle adjustment device according to claim 1.

9. An electric seat, comprising a chair seat and a chair back, the chair seat being connected to the chair back through an angle adjustment device, wherein the angle adjustment device is the angle adjustment device according to claim 2.

10. An electric seat, comprising a chair seat and a chair back, the chair seat being connected to the chair back through an angle adjustment device, wherein the angle adjustment device is the angle adjustment device according to claim 3.

11. An electric seat, comprising a chair seat and a chair back, the chair seat being connected to the chair back through an angle adjustment device, wherein the angle adjustment device is the angle adjustment device according to claim 4.

12. An electric seat, comprising a chair seat and a chair back, the chair seat being connected to the chair back through an angle adjustment device, wherein the angle adjustment device is the angle adjustment device according to claim 5.

13. An electric seat, comprising a chair seat and a chair back, the chair seat being connected to the chair back through an angle adjustment device, wherein the angle adjustment device is the angle adjustment device according to claim 6.

14. An electric seat, comprising a chair seat and a chair back, the chair seat being connected to the chair back through an angle adjustment device, wherein the angle adjustment device is the angle adjustment device according to claim 7.

* * * * *